(12) United States Patent
Nixon et al.

(10) Patent No.: US 9,518,196 B2
(45) Date of Patent: Dec. 13, 2016

(54) POLYESTER SILICATES

(71) Applicant: AKZO NOBEL COATINGS INTERNATIONAL B.V., Arnhem (NL)

(72) Inventors: Steven Alister Nixon, Tyne & Wear (GB); Susan Pritchard, Tyne & Wear (GB); Sarah Donnely, Lancashire (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 14/655,966

(22) PCT Filed: Dec. 30, 2013

(86) PCT No.: PCT/EP2013/078098
§ 371 (c)(1),
(2) Date: Jun. 26, 2015

(87) PCT Pub. No.: WO2014/106610
PCT Pub. Date: Jul. 10, 2014

(65) Prior Publication Data
US 2015/0353764 A1 Dec. 10, 2015

Related U.S. Application Data

(60) Provisional application No. 61/756,079, filed on Jan. 24, 2013.

(30) Foreign Application Priority Data

Jan. 4, 2013 (EP) .................................. 13150276

(51) Int. Cl.
| | | |
|---|---|---|
| *C09D 167/06* | (2006.01) | |
| *C09D 183/10* | (2006.01) | |
| *C09D 167/03* | (2006.01) | |
| *C08G 83/00* | (2006.01) | |
| *C08G 63/695* | (2006.01) | |
| *C08G 77/445* | (2006.01) | |

(52) U.S. Cl.
CPC ......... *C09D 167/03* (2013.01); *C08G 63/6958* (2013.01); *C08G 83/001* (2013.01); *C09D 183/10* (2013.01); *C08G 77/445* (2013.01)

(58) Field of Classification Search
None
See application file for complete search history.

(56) References Cited

U.S. PATENT DOCUMENTS

| | | | |
|---|---|---|---|
| 2,584,344 A | 2/1952 | Goodwin et al. | |
| 3,846,359 A | 11/1974 | Rostaing | |
| 3,960,805 A * | 6/1976 | Taylor ...................... | C08K 3/20 524/701 |
| 4,069,178 A | 1/1978 | Mikami et al. | |
| 4,354,013 A | 10/1982 | Kimura | |
| 4,368,294 A | 1/1983 | Deubzer et al. | |
| 4,467,081 A | 8/1984 | Chang et al. | |
| 4,480,072 A * | 10/1984 | Mallon ...................... | C08F 8/42 525/342 |
| 4,613,451 A | 9/1986 | Chang et al. | |
| 5,457,166 A | 10/1995 | Yoshikawa et al. | |
| 5,733,644 A * | 3/1998 | Tanaka ...................... | C08L 83/02 428/215 |
| 5,780,530 A | 7/1998 | Mizutani et al. | |
| 5,786,435 A | 7/1998 | Marutani et al. | |
| 5,821,314 A | 10/1998 | Ikushima et al. | |
| 6,008,291 A | 12/1999 | Weinberger et al. | |
| 6,013,724 A * | 1/2000 | Mizutani .............. | C09D 183/02 106/15.05 |
| 2002/0041960 A1 | 4/2002 | Fournier et al. | |
| 2005/0238899 A1 | 10/2005 | Nagata et al. | |
| 2008/0017070 A1 | 1/2008 | Prezzi et al. | |

FOREIGN PATENT DOCUMENTS

| | | |
|---|---|---|
| DE | 1165867 | 3/1964 |
| DE | 2313098 | 1/1974 |
| DE | 256520 | 5/1988 |
| DE | 4305619 | 8/1994 |
| DE | 102008033315 | 1/2010 |
| EP | 0029100 | 5/1981 |
| EP | 0114512 | 8/1984 |
| EP | 754739 | 1/1997 |
| EP | 0838506 | 4/1998 |
| EP | 754739 | 10/2003 |
| GB | 663599 | 12/1951 |
| GB | 740265 | 11/1955 |
| GB | 1423408 | 2/1976 |
| GB | 2212163 | 7/1989 |
| GB | 2230267 | 10/1990 |
| JP | 60197773 | 10/1985 |
| JP | 61127728 | 6/1986 |
| JP | 63213575 | 9/1988 |
| JP | 01048818 | 2/1989 |
| JP | 05255349 | 5/1993 |
| JP | 05214021 | 8/1993 |
| JP | 05255348 | 10/1993 |
| JP | 05295060 | 11/1993 |
| JP | 05295294 | 11/1993 |
| JP | 7068217 | 3/1995 |
| JP | 07278489 | 10/1995 |
| JP | 8-127751 | * 5/1996 |
| JP | 2000191980 | 7/2000 |
| WO | 2012/066520 | 5/2012 |

OTHER PUBLICATIONS

Machine translation of JP 8-127751 into English (no date).*
European Search Report for EP Application No. 13150276.7, dated May 28, 2013.
International Search Report and Written Opinion for International Application No. PCT/EP2013/078098, mailed on Jan. 23, 2014.

\* cited by examiner

*Primary Examiner* — Marc Zimmer
(74) *Attorney, Agent, or Firm* — McDonnell Boehnen Hulbert & Berghoff LLP

(57) ABSTRACT

Provided herein are coating compositions comprising the reaction product of a tetra alkyoxyorthosilicate or a partially condensed oligomer thereof and a polyester resin containing hydroxyl groups. The coating compositions advantageously have a high solid content and/or low volatile organic content (VOC) in combination with a low viscosity. The coating compositions are capable of drying quickly, curing in ambient conditions and may be formulated in one-pack.

20 Claims, No Drawings

POLYESTER SILICATES

REFERENCE TO RELATED APPLICATIONS

This application is the U.S. National Phase of PCT/EP2013/078098, filed on Dec. 30, 2013, and claims the benefit of EP Application No. 13150276.7, filed on Jan. 4, 2013, and U.S. Provisional Application No. 61/756,079, filed on Jan. 24, 2013.

Considerable effort has been expended in recent years to develop coating compositions having a lower volatile organic content (VOC) due to environmental hazards associated with high levels of VOCs and legislation limiting the VOC in coating compositions. However many attempts to decrease the volatile organic content (VOC) and/or increase the solid content of the coatings are generally met with compromises in respect of other desirable properties of the coating composition. Notably, an increase in solid content and decrease in VOC usually results in an unacceptable increase in application viscosity. A desirable viscosity is one which enables the coating composition to be applied and dry rapidly at ambient conditions by spray, roller or brush. Ambient curing coating compositions are particularly desirable when coating large structures such ships, buildings, bridges, industrial plants and oil rigs. Other desirable properties that are often adversely affected due to an increase in solid content/reduction in VOC include the speed of drying, the ability to cure in ambient conditions, and the stability of the coating compositions.

Provided herein are novel coating compositions which advantageously have a high solid content and/or low volatile organic content (VOC) in combination with an acceptably low viscosity enabling the formulation to be applied by standard techniques. The coating compositions are capable of drying quickly and curing in ambient conditions. A further advantage is that the coating compositions may be formulated in one-pack.

The coating compositions of the present invention comprise the reaction product of a tetraalkyoxyorthosilicate or a partially condensed oligomer thereof and a polyester resin containing hydroxyl groups (preferably ethylenically unsaturated), wherein polyester resin has a number average molecular weight of between about 1250 and about 4000, and a hydroxyl equivalent weight of between about 800 and about 4500, and the ratio of alkoxy groups on the tetra alkyoxyorthosilicate to hydroxyl groups on the polyester resin containing hydroxyl groups is in the range of 2:1 to 40:1 (alkoxy groups:hydroxyl groups).

Paint skinning is a fairly common occurrence throughout the paint industry. By paint skinning, we mean the development of a paint skin when the paint inside the paint-container comes into contact with the underside of the lid during handling, shipping, tinting and/or normal use. When conditions are right, the paint on the lid can dry, form a skin and subsequently fall back into the paint causing lumps to be suspended in the paint. Lower VOC/higher solids paints are most likely to skin.

However, surprisingly the coating compositions of the invention have a reduced tendency to skin compared to coating compositions comprising unmodified polyesters, or silicate-modified polyesters outside the scope of the claims of the present invention.

Coating compositions comprising polyesters, such as long chain alkyds, are known. However such compositions dry slowly and suffer from poor film properties.

Coating compositions comprising blends of polyols and organic silicone-containing material are known. For example, U.S. Pat. No. 4,613,451 discloses a liquid composition comprising a mixture of (A) a hydrophobic polyol and (B) an organic silicone-containing material. After the components (A) and (B) are mixed, the composition is capable of self-curing to continuous film by reaction with moisture and/or the hydrophobic polyol. However, unlike the ambient curing coating composition of the present invention, curing is only effected when heat is applied (temperatures of about 121° C.). No mention is made of an ambient curing coating composition. No mention is made of a composition comprising a reaction product of (A) and (B).

GB1423408 discloses the preparation of a paint by reacting an alkyd resin, a resin obtained by polymerizing olefinically unsaturated monomers, and a very small amount (2-10 wt %) of alkoxysilane. The result is a low solids polyol (ca. 60% solids content) for use in a 2-pack thermally cured polyol-melamine formaldehyde system. No mention is made of a one pack, ambient curing coating composition comprising a reaction product comprising residual SiOR groups.

U.S. Pat. No. 5,457,166 discloses a polyester-modified silicone resin prepared by mixing an alkoxysilane with polyester resin having at least two hydroxyl groups and subjecting the mixture to hydrolysis and polycondensation in the presence of an acid catalyst. However U.S. Pat. No. 5,457,166 teaches that the compositions must be cured with heat. No mention is made of ambient curing coating compositions comprising a reaction product prepared from the polyesters defined herein.

The Polyester Resin Containing Hydroxyl Groups

The polyester resin for preparing the reaction product has a number average molecular weight of between about 1250 and about 4000, and a hydroxyl equivalent weight of between about 800 and about 4500.

The number average molecular weight numbers can be measured using gel permeation chromatography in accordance with ASTM method D5296-11. Preferably the number average molecular weight of the polyester resin is between about 1250 and about 2500, and even more preferably between about 1500 and 2500.

The hydroxyl equivalent weight of the polyester resin must be between about 800 and about 4500. This is equivalent to a hydroxyl value ranging from 11 to 70. Preferably the hydroxyl equivalent weight of the polyester resin is between about 800 and about 3,000.

The hydroxyl value may be determined experimentally according to ASTM Method E222 (revision10), Test Method A. The hydroxyl value (OHV) is the milligrams of potassium hydroxide equivalent to the hydroxyl content in one gram of polyol.

i.e. Hydroxyl number=56.1×1000/hydroxyl equivalent weight, where 56.1 is the atomic weight of potassium hydroxide, 1000 is the number of milligrams in one gram of sample and the hydroxyl equivalent weight is the grams of a polyol you need to have for one equivalent of reactive OH groups.

Preferably, the polyester resin is ethylenically unsaturated or substantially ethylenically unsaturated. Preferably the polyester resin is ethylenically unsaturated to the extent that it has an iodine value of between 50 to 120 cg/g. The iodine value is the amount of iodine, in centigrams, that is taken up by 1 gram of the polyester resin measured according to ASTM method D5768-02 (2010).

It is particularly preferred that the polyester resin containing hydroxyl groups has an average of less than two hydroxyl groups in one molecule, for example an average of less than 1.5 hydroxyl groups per molecule. If the hydroxyl functionality is significantly greater than two this leads to an increased risk of gelation when the polyester is reacted with the tetra alkoxy orthosilicate (oligomer).

The polyesters may be prepared by reacting polyols and polycarboxylic acids (optionally in combination with monohydric alcohols/acids). The polyester resins may be modified with one or more fatty acids (and in this case the polyester would be known as an alkyd resin).

Examples of polyols useful in the preparation of the polyesters of the present invention include simple diols, triols, and higher hydric alcohols. Acceptable polyols preferentially comprise between 2 to 14 carbon atoms. Polyols are generally known, examples of which include: 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis (hydroxymethyl)cyclohexane; 1,2-bis (hydroxyethyl) cyclohexane; 2,2-dimethyl-3-hydroxypropyl-2,2-dimethyl-3-hydroxypropionate; dipropylene glycol; glycerol; pentaerythritol, dipentaerythritol, trimethylolethane, trimethylolpropane, ethylene glycol, propylene glycol, neopentylene glycol and dipropylene glycol and combinations thereof. Preferred polyols include trimethylol propane and pentaerythritol and combinations thereof.

Examples of acceptable polycarboxylic acids include cyclic polycarboxylic acids, aromatic polycarboxylic acids and cycloaliphatic polycarboxylic acids.

Examples of suitable aromatic polycarboxylic acids include isophthalic acid, phthalic acid, terephthalic acid, trimellitic acid. Anhydrides of the above acids, where they exist, can also be employed and are encompassed by the term "polycarboxylic acid", e.g. phthalic anhydride and trimellitic anhydride.

Examples of cycloaliphatic polycarboxylic acids include 1,2-cyclohexane dicarboxylic acid, 1,3-cyclohexane dicarboxylic acid, tetrahydrophthalic acid, endomethylene tetrahydrophthalic acid, hexahydrophthalic acid tetrachlorophthalic acid and methyl hexahydrophthalic acid. Anhydrides of the above acids, where they exist, can also be employed, such as tetrahydrophthalic anhydride, endomethylene tetrahydrophthalic anhydride, hexahydrophthalic anhydride and methyl hexahydrophthalic anhydride.

Examples of acyclic polycarboxylic acids include malonic acid, succinic acid, malic acid glutaric acid, adipic acid, octenyl succinic acid, dodecenyl succinic acid, azelaic acid, sebacic acid malonic acid, pimelic acid, suberic acid, 2,2-dimethylsuccinic acid, 3,3-dimethylglutaric acid, 2,2-dimethylglutaric acid, maleic acid, fumaric acid and itaconic acid. Anhydrides of the above acids, where they exist, can also be employed such as dimethyl ester and diethyl ester of malonic acid, succinic anhydride, octenyl succinic anhydride, and dodecenyl succinic anhydride.

Preferred polycarboxylic acids include isophthalic, terephthalic and phthalic polycarboxylic acids and combinations thereof.

In addition, certain materials which react in a manner similar to acids to form polyester polyols are also useful. Such materials include lactones such as caprolactone, propylolactone and methyl caprolactone, and hydroxy acids such as hydroxy caproic acid and dimethylolpropionic acid.

If a triol or higher hydric alcohol is used, a monocarboxylic acid, such as acetic acid and benzoic acid, may be used in the preparation of the polyester polyol.

Examples of the optional monohydric alcohols which may be used to prepare the polyester polyols include: ethanol, propanol, isopropanol, n-pentanol; neopentyl alcohol; 2-ethoxyethanol; 2-methoxyethanol; 1-hexanol, cyclohexanol; 2-methyl-2-hexanol; 2-ethylhexyl alcohol; 1-octanol, 2-octanol, 1-nonanol; 5-butyl-5-nonanol, isodecyl alcohol, and the like.

Moreover, the term polyester polyols as used herein is intended to encompass polyester polyols optionally also modified with fatty acids or glyceride oils of fatty acids (i.e. conventional alkyd polyols containing such modification). They typically are produced by reacting polyhydric alcohols, polycarboxylic acids, and fatty acids derived from drying, semi-drying or non-drying oils. The techniques of preparing alkyd resins are well-known. Usually, the process involves reacting together the polycarboxylic acid and fatty acid or a partial glyceride thereof and the polyhydric alcohol (the latter usually in stoichiometric excess) in the presence of a catalyst such as litharge, sulfuric acid, or sulfonic acid to effect esterification with evolution of water.

Examples of suitable fatty acids include saturated and unsaturated acids comprising up to 20 carbon atoms, preferably up to 16 carbon atoms, and in some cases up to 12 carbon atoms. Examples of fatty acids include stearic acid, oleic acid, ricinoleic acid, palmitic acid, linoleic acid, linolenic acid, licanic acid, elaeostearic acid, clupanodonic acid, anteisoarachadic, behenic, bosseopentaenoic, capric, caprylic, catalpic, eicosadienoic, erydiogenic, isomargaric, isomyristic, jacaric, lauric, lesquerolic, myristic, parinaric, punicic, ricinenic, rumenic, rumelenic, and mixtures thereof. Fatty acid derivatives of oils useful in the present alkyds include, may be derivatives of linseed oil, soybean oil, dehydrated castor oil, raw castor oil, lesquerella oil, peanut oil, tall oil, tung oil, fish oil, sunflower oil, safflower oil, cottonseed oil, rapeseed oil, olive oil, coconut oils, or combinations thereof.

Preferred fatty acids include tall oil, tung oil, sunflower oil and safflower oil and combinations thereof.

The fatty acids may be in the form of the free acids with sufficient excess of the polyhydric alcohol being incorporated into the esterification mixture to compensate for their inclusion. However, in many instances, it is preferred to employ glyceride oils which have been partially alcoholized with a sufficient amount of a polyhydric alcohol such as glycerol to supply the requisite amount of available hydroxyls for the formation of the alkyd polyol.

Tetra-alkyoxyorthosilicate

The tetra-alkoxyorthosilicate and the partially condensed oligomers thereof that can be used to prepare the silicate-modified epoxy resin are represented by the formula:

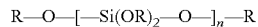

R—O—[—Si(OR)$_2$—O—]$_n$—R wherein each R is independently selected from alkyl and aryl groups having up to 6 carbon atoms and —Si(OR)$_3$ groups, and n=1-20.

Preferably the tetra-alkyoxyorthosilicate or a partially condensed oligomer thereof, is a tetra-C1-C5 alkyoxyorthosilicate or a partially condensed oligomer thereof.

In preferred embodiments, R may be selected from methyl, ethyl, propyl, isopropyl, and butyl; most preferably R is ethyl.

Examples of suitable tetra-alkoxyorthosilicates are tetra-methoxyorthosilicate, tetra-ethoxyorthosilicate, tetra-propoxyorthosilicate, tetra-isopropoxyortho-silicate, tetra-butoxyorthosilicate, and partially polymerised/oligomerised forms thereof. A most preferred tetra-alkoxyorthosilicate is a partially oligomerised tetra-ethoxyorthosilicate such as the commercially available tetra-ethoxy-orthosilicates TES40 (ex Wacker) and Dynasil 40 (ex Degussa).

The Preparation of the Silicate-Modified polyester Resin (the "Reaction Product")

The present invention relates to a silicate-modified polyester resin obtainable by dealcoholisation condensation of a tetra-alkoxyorthosilicate or a partially condensed oligomer thereof and a polyester resin which contains hydroxyl groups wherein the polyester resin has a number average molecular weight of between about 1250 and about 4000, and a hydroxyl equivalent weight of between about 800 and about 4500, wherein the ratio of alkoxy groups on the tetra-alkyoxyorthosilicate to hydroxyl groups on the polyester resin containing hydroxyl groups is in the range of 2:1 to 40:1 (alkoxy groups:hydroxyl groups).

Preferably, the ratio of alkoxy groups on the tetra-alkyoxyorthosilicate to hydroxyl groups on the polyester resin containing hydroxyl groups is in the range of 6:1 to 30:1, most preferably in the range of 8:1 to 20:1.

Since there is an excess of alkoxy groups to hydroxyl groups, the reaction product will comprise SiOR function groups.

If the ratio of alkoxy groups on the tetra alkyoxyorthosilicate to hydroxyl groups on the polyester resin containing hydroxyl groups is greater than 40:1 then the weight fraction of tetra-alkoxyorthosilicate in the formulation is sufficiently large that the ethanol generated during crosslinking of the orthosolicate is such that it becomes almost impossible to formulate low VOC coatings.

If the ratio of alkoxy groups on the tetra alkyoxyorthosilicate to hydroxyl groups on the polyester resin containing hydroxyl groups is less than 2:1 then the resin, if it does not gel during the dealcoholisation reaction, will be of such high viscosity that it is impossible to formulate into a low VOC coating.

The present invention also therefore relates to a process for the preparation of the silicate-modified polyester resin as described above by heating, in the presence of a catalyst, a mixture of the tetra-alkoxyorthosilicate or a partially condensed oligomer thereof with the polyester resin which contains hydroxyl groups.

The reaction temperature of the dealcoholisation condensation reaction preferably ranges from 80° C. to 150° C., more preferably from 100 to 120° C. The reaction is preferably conducted for about 1 to about 12 hours and under substantially anhydrous conditions in order to prevent polycondensation reactions of the tetra-alkoxyorthosilicate.

Suitably the silicate-modified polyester resin is prepared from 10 to 40 weight of tetra-alkyoxyorthosilicate or partially condensed oligomer thereof, and 60 to 90 weight % of polyester resin containing hydroxyl groups, wherein weight % is based on the total weight of non volatile components in the composition used to prepare the reaction product.

The non volatile content can be measured in accordance with ASTM method D2697.

More suitably, the silicate-modified polyester resin is prepared from 15 to 40 weight % (for example 20-30 weight %) of tetra alkyoxyorthosilicate or partially condensed oligomer thereof, and 60 to 85 weight % (for example 70-80 weight %) of polyester resin containing hydroxyl groups, wherein weight % is based on the total weight of non volatile components in the composition used to prepare the reaction product.

Suitable catalysts for this dealcoholisation condensation reaction are conventionally known catalysts. Examples of such catalysts are metals like lithium, sodium, potassium, rubidium, caesium, magnesium, calcium, barium, strontium, zinc, aluminium, titanium, cobalt, germanium, tin, lead, antimony, arsenic, cerium, boron, cadmium, and manganese, their oxides, organic acid salts, halides, or alkoxides. Organotitanium and organotin compounds are preferred catalysts. Even more preferred are dibutyltin dilaurate, and tetra-alkyl titanium compounds.

The resulting silicate-modified polyester resin may contain some unreacted polyester resin and/or unreacted tetra-alkoxyorthosilicate. The unreacted tetra-alkoxyorthosilicate can be converted to silica by hydrolysis and condensation. To promote the hydrolysis and condensation, a small amount of water may be added to the silicate-modified epoxy resin when used.

The Coating Composition and Application Thereof

The coating composition according to the present invention advantageously is formulated in 1-pack. The 1-pack composition will cure via a dual cure mechanism (by moisture cure and autoxidation). Hence, this composition should be substantially free of moisture and protected from exposure to atmospheric oxygen.

"Substantially free of moisture" in this specification means containing less than 1.0 wt %, more preferably less than 0.5 wt %, and most preferably less than 0.1 wt % of water.

Surprisingly, the inventors have found that the silicate modified polyesters can produce high solids, low VOC one pack compositions, which produce coatings that have fast drying speeds at ambient and sub ambient conditions.

The coating composition according to the invention may also contain a compound which acts as a catalyst for Si—O—Si condensation. In general, the coating composition is capable of curing under ambient temperature and humidity conditions to a tack-free coating in 2 to 10 hours even without such a catalyst, but a catalyst may be preferred to give a faster cure.

One example of a catalyst for Si—O—Si condensation is an alkoxytitanium compound, for example a titanium chelate compound such as a titanium bis(acetylacetonate) dialkoxide, e.g., titanium bis(acetylacetonate) diisopropoxide, a titanium bis(acetoacetate) dialkoxide, e.g., titanium bis(ethyl-acetoacetate)diisopropoxide, or an alkanolamine titanate, e.g., titanium bis(triethanolamine)diisopropoxide, or an alkoxytitanium compound which is not a chelate such as tetra(isopropyl) titanate or tetrabutyl titanate. Such titanium compounds containing alkoxy groups bonded to the titanium may not act as catalysts alone, since the titanium alkoxide group is hydrolysable and the catalyst may become bound to the cured composition by Si—O—Ti linkages. The presence of such titanium moieties in the cured composition may be advantageous in giving even higher heat stability. The titanium compound can for example be used at 0.1 to 5% by weight of the binder. Corresponding alkoxide compounds of zirconium or aluminium are also useful as catalysts.

An alternative catalyst for Si—O—Si condensation is a nitrate of a polyvalent metal ion such as calcium nitrate, magnesium nitrate, aluminium nitrate, zinc nitrate, or strontium nitrate. Calcium nitrate is an effective catalyst for curing a silicate by Si—O—Si condensation when the composition also includes an organic amine. The calcium nitrate is preferably used in its tetrahydrate form, but other hydrated forms can be used. The level of calcium nitrate catalyst required generally is not more than 3% by weight of the binder, for example 0.05 to 3% by weight. Coatings cured using calcium nitrate catalyst are especially resistant to yellowing on exposure to sunlight.

Another example of a suitable catalyst is an organotin compound, for example a dialkyltin dicarboxylate such as dibutyltin dilaurate or dibutyltin diacetate. Such an organotin catalyst can for example be used at 0.05 to 3% by weight, based on the weight of the silicate-modified epoxy resin.

Other compounds effective as catalysts in the coating compositions of the invention are organic salts, such as carboxylates, of bismuth, for example bismuth tris(neodecanoate). Organic salts and/or chelates of other metals such as zinc, aluminium, zirconium, tin, calcium, cobalt, or strontium, for example zirconium acetylacetonate, zinc acetate, zinc acetylacetonate, zinc octoate, stannous octoate, stannous oxalate, calcium acetylacetonate, calcium acetate, calcium 2-ethylhexanoate, cobalt naphthenate, calcium dodecylbenzene sulphonate, or aluminium acetate, may also be effective as catalysts. The moisture cure reaction is also catalysed by bases, amines for example 1,8-Diazabicyclo [5.4.0]undec-7-ene, and guanidines.

The coating composition of the invention may contain one or more further ingredients. It may contain solvents. Preferably however the solids content is at least 70 vol %.

It may also contain one or more pigments, for example titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate and/or a filler pigment such as barytes, talc or calcium carbonate. The composition may also contain one or more thickening agents such as fine-particle silica, bentonite clay, hydrogenated castor oil, or polyamide wax, one or more plasticisers, pigment dispersants, stabilisers, mould releasing agents, surface modifiers, fire retardants, antibacterial agents, antimoulds, levelling agents, and antifoaming agents, etc.

Preferably, the coating composition of the present invention comprises a volatile organic content (VOC) of less than 250 grams of solvent per liter of the composition (g/l) and/or the solids content of at least 70% by volume.

Preferably the calculated solids content is higher than 75% by volume, and more preferably higher than 80% by volume, based on the total volume of all the components in the coating composition.

Preferably the VOC does not exceed 200 g/L. The VOC of the coating composition may be determined according to EPA Federal Method 24.

If the coating composition has the form of a 2-pack composition, the solids content and VOC corresponds to the solids content and the VOC of the composition after mixing both packs.

Despite the high solids content and/or low VOC, the coating composition of the invention can also have a low viscosity. A desirably low viscosity is below 20 poise at 25° C. (50% relative humidity), and even more desirably below 15 poise at 25° C., and even desirably below 10 poise at 25° C. as measured according to ASTM D 4287 00. The low viscosity means that the coating it can be applied by standard techniques such as spray, roller or brush.

Since the coating composition of the invention generally cures at ambient temperatures or even lower, for example −5 to 30° C. (e.g. at 50% RH), it is thus suitable for application to large structures where heat-curing is impractical. The coating composition of the invention alternatively may be cured at elevated temperatures, for example from 30 or 50° C. up to 100 or 130° C., if so desired.

The hydrolysis of silicon-bonded alkoxy groups depends on the presence of moisture: in almost all climates atmospheric moisture is sufficient, but a controlled amount of moisture may need to be added to the coating when curing at sub-ambient temperature or when curing in very low humidity (desert) locations. The water is preferably packaged separately from any compound or polymer containing silicon-bonded alkoxy groups.

The coating composition of the invention can be used as finish coatings and/or primer coatings. A finish coating according to the invention can be applied over various primer coatings, for example inorganic zinc silicate or organic zinc-rich silicate primers and organic, e.g. epoxy resin, primers containing zinc metal, corrosion-inhibiting pigments, metal flakes, or barrier pigments. The coating composition can for example be used as a finish coating on buildings, steel structures, automobiles, aircraft and other vehicles, and general industrial machinery and fitments. The finish coating can be pigmented or it can be a clear (non-pigmented) coat, particularly on cars or yachts. The coating composition can be applied directly to prepared carbon steel as a primer/finish. Primer coating compositions according to the invention can be used as maintenance and repair coatings on less than perfect surfaces such as aged blasted steel or "ginger" (steel which has been blasted and has started to rust in small spots), hand-prepared weathered steel, and aged coatings.

The coating composition may contain an alcohol, e.g. ethanol or butanol, preferably packaged in pack 1, to extend pot life and control initial speed of curing.

The invention will now be elucidated with reference to the following examples. These are intended to illustrate the invention but are not to be construed as limiting in any manner the scope thereof.

EXAMPLES

Test Methods Used in the Examples

The Non Volatile Content (NVC/% solid content) was determined by placing a known weight (~0.3 g) of polymer solution into a pre-weighed aluminum dish and heating the sample in an oven at 105° C. for 30 minutes and reweighing the dish. The non volatile content can be calculated from the difference in weight between the pre-heated and post-heated sample (ASTM method D2697).

The viscosity was measured using a high shear viscometer in accordance with ASTM D 4287 00 with a shear rate of 10,000-12,000 s$^{-1}$, at a temperature of 25° C.

The Volatile Organic Content (VOC) of the coating composition was determined according to EPA Federal Method 24.

The time for the coatings to dry was measured by BK dry track recorder (ASTM D 5895).

Example 1

Demonstration of the Reduction in Drying Time of Silicate Modified Alkyds Compared with Unmodified Alkyds Setal 291 XX99 (500 g—Setal 291 XX99 is a commercially available long oil alkyd with a hydroxyl equivalent weight of 2250), TES40WN (tetraethylorthosilicate, 124.33 g) and titanium (IV) butoxide (0.6 g) were added to a reaction vessel equipped with a mechanical stirrer, nitrogen inlet, condenser and thermocouple. The reaction vessel was purged with nitrogen for 15 minutes after which time the contents of the reaction vessel were heated to 100° C. for a total of 12 hours. The reaction product was a clear orange liquid with a viscosity of 11.4 poise and a non-volatile content of 94.5 wt % Setal 291XX99 has a quoted viscosity of 20-30 poise, with a non volatile content of >99%.

TES40WN is a partially condensed ethyl silicate polymer, 40 refers to the % Si in the material. $^{29}$Si NMR of TES40WN suggests it has an empirical formula of $SiO_{0.8}(OEt)_{2.4}$, and therefore an ethoxy equivalent weight of 62. This value was used to calculate the SiOR:OH ratio in the polymer formulations. In this example the ratio was 9:1

To demonstrate the improvement in drying speed achievable by the alkyd silicate the drying time of the alkyd silicate described above was determined alongside that of the unmodified alkyd (Setal 291XX99). The polymer (25 g) was mixed with a Co drier (0.6 g), a Ca drier (0.3 g) and diazabicycloundecene (0.1 g) and films cast onto a glass slide using a 200µ cube applicator and the time for the coatings to dry at 25° C. was measured by BK dry track recorder in accordance with ASTM D 5895. The alkyd silicate from example 1 had dried within 3 hours whilst the unmodified alkyd had a drying time in excess of three hours.

Examples 2-7

Preparation of Alkyd Silicates According to the Invention

TABLE 1 amounts of each reagent (grams) used to prepare the alkyd silicates of Examples 2-7 and calculated properties of the formulations.

|  | Example 2 | Example 3 | Example 4 | Example 5 | Example 6 | Example 7 |
|---|---|---|---|---|---|---|
| Pentaerythritol | 70.3 | 65.3 | 65.3 | 73.4 | 73.4 | 65.3 |
| IPA | 30.4 | 41.5 | 49.8 | 49.8 | 33.3 | 36.5 |
| TOFA | 374.4 | 365.7 | 351.4 | 334.1 | 362.6 | 374.4 |
| TES 40 | 137.9 | 106.4 | 135.4 | 132.8 | 136.3 | 204.1 |
| Number average molecular weight | 1337.6 | 1922.2 | 2416.4 | 1777.9 | 1298.2 | 1714.6 |
| OH Equivalent weight | 1119 | 2984 | 4430 | 1070 | 885 | 2500 |
| OH Functionality (Fn) | 1.195 | 0.644 | 0.545 | 1.661 | 1.467 | 0.686 |
| Ratio SiOEt:OH | 5.59 | 11.62 | 22.31 | 5.39 | 4.42 | 18.50 |

In the first stage a wide neck round bottom flask was charged with pentaerythritol, isophthalic acid (IPA), tall oil fatty acid (TOFA) and titanium (IV) butoxide as a catalyst. The flask was enclosed by a flange lid with 5 inlets equipped with nitrogen supply, thermocouple connected to the heating mantel on which the flask is rested, Dean and Stark apparatus fitted with a condenser, and a stopper. In the centre was an anchor stirrer, turned mechanically via a band. The monomers were heated to promote the esterification reaction at a maximum temperature of 250° C., under nitrogen, until acid value of <5 mg KOH/g was achieved. The Dean and Stark apparatus allows the removal of water from the reaction flask to help achieve high conversions. Xylene (~5 wt %) can be added to facilitate removal of water if required, and was done so in these examples.

The second stage, reaction of the alkyd with TES40WN (tetraethylorthosilicate oligomer) was conducted in the same reaction vessel, with the Dean and Stark apparatus removed and the reaction flask set up for reflux. TES40WN was added to the alkyd precursor at room temperature. The reaction mixture was heated at 120° C. for 12 hours, using a catalytic amount of titanium (IV) butoxide, previously added in stage I. The reaction mixture was initially incompatible but became homogenous as the TESwoWN reacted with the alkyd polymer.

The viscosity (@25° C.), non-volatile content and hard-dry-time of the alkyd resin were measured and are presented in Table 2.

TABLE 2 properties of alkyd silicates

|  | Example 2 | Example 3 | Example 4 | Example 5 | Example 6 | Example 7 |
|---|---|---|---|---|---|---|
| Viscosity (poise) | 2.2 | 5.4 | 9.7 | 9.4 | 5 | 1.5 |
| NVC (Wt %) | 91.91 | 89.91 |  | 91.98 | 95.46 | 88.85 |
| Hard Dry Time (Hours) | 1.8 | 2.8 | 4 | 7.5 | 8 | 9 |

Examples 8-10

Preparation of Alkyd Silicates Outside the Teaching of the Invention

TABLE 3 amounts of each reagent (grams) used to prepare the alkyd silicates of Examples 8-10 and calculated properties of the formulations.

|  | Example 8 | Example 9 | Example 10 |
|---|---|---|---|
| Pentaerythritol | 68.0 | 81.6 | 70.5 |
| IPA | 66.4 | 66.4 | 16.6 |
| TOFA | 316.8 | 288.0 | 398.0 |
| TES 40 | 112.8 | 109.0 | 121.3 |
| OH Eq Wt | 4264 | 676 | 936 |
| Mn | 4193 | 2025 | 1094 |

The alkyd formulations of Examples 8-10 were prepared as described in examples 2-7 above. The alkyd in Example 8 gelled during manufacture. The alkyd silicate of Example 9 gelled during the second stage reaction between the alkyd and TES40WN. The alkyd in Example 10 was prepared successfully, but did not dry within 7 days when cured under the conditions described in Example 1.

The invention claimed is:

1. An ambient curing coating composition comprising a reaction product of a tetra alkyoxyorthosilicate or a partially condensed oligomer thereof and a polyester resin containing hydroxyl groups, wherein
   (a) the polyester resin has a number average molecular weight of between about 1250 and about 4000, and a hydroxyl equivalent weight of between about 800 and about 4500, and
   (b) the ratio of alkoxy groups on the tetra alkyoxyorthosilicate to hydroxyl groups on the polyester resin containing hydroxyl groups is in the range of 2:1 to 40:1.

2. The ambient curing coating composition of claim 1, wherein the reaction product is prepared from 15 to 40 weight % of the tetra alkyoxyorthosilicate or partially condensed oligomer thereof, and 60 to 85 weight % of the polyester resin containing hydroxyl groups, wherein weight % is based on the total weight of non volatile components in the composition used to prepare the reaction product.

3. The ambient curing coating composition of claim 1, wherein the polyester resin containing hydroxyl groups is ethylenically unsaturated.

4. The ambient curing coating composition of claim 1, wherein the polyester resin containing hydroxyl groups comprises less than two hydroxyl groups per molecule.

5. The ambient curing coating composition of claim 1, wherein the tetra alkyoxyorthosilicate or the partially condensed oligomer thereof, is a tetra-C1-C5 alkyoxyorthosilicate or a partially condensed oligomer thereof.

6. The ambient curing coating composition of claim 1, wherein the polyester resin has a number average molecular weight of between about 1250 and about 2500, and a hydroxyl equivalent weight of between about 800 and about 3000.

7. The ambient curing coating composition of claim 1, wherein said coating composition has at least one of a solids content of at least 70 vol % or a volatile organic content (VOC) not exceeding 250 g/l.

8. The ambient curing coating composition of claim 1, wherein the polyester resin containing hydroxyl groups is an alkyd resin.

9. A one-pack coating composition, comprising the ambient curing coating composition of claim 1.

10. A silicate-modified polyester resin obtained by dealcoholisation condensation of a tetra-alkoxyorthosilicate or a partially condensed oligomer thereof and a polyester resin which contains hydroxyl groups, wherein
    (a) the polyester resin has a number average molecular weight of between about 1250 and about 4000, and a hydroxyl equivalent weight of between about 800 and about 4500, and
    (b) the ratio of alkoxy groups on the tetra alkyoxyorthosilicate to hydroxyl groups on the polyester resin containing hydroxyl groups is in the range of 2:1 to 40:1.

11. A process for the preparation of the silicate-modified polyester resin according to claim 10, the process comprising heating, in the presence of a catalyst, a mixture of the alkoxyorthosilicate or the partially condensed oligomer thereof with the polyester resin which contains hydroxyl groups.

12. A process for coating a substrate comprising the steps of (i) applying on the substrate the coating composition according to claim 1, and (ii) curing the applied coating composition.

13. The process according to claim 12 wherein the curing is performed at a temperature in the range of −5° C. to 30° C.

14. A coated substrate obtained by the process of claim 12.

15. The ambient curing coating composition of claim 2, wherein the polyester resin containing hydroxyl groups is ethylenically unsaturated.

16. The ambient curing coating composition of claim 3, wherein the polyester resin containing hydroxyl groups comprises less than two hydroxyl groups per molecule.

17. The ambient curing coating composition of claim 4, wherein the tetra alkyoxyorthosilicate or the partially condensed oligomer thereof, is a tetra-C1-C5 alkyoxyorthosilicate or a partially condensed oligomer thereof.

18. The ambient curing coating composition of claim 3, wherein the polyester resin has a number average molecular weight of between about 1250 and about 2500, and a hydroxyl equivalent weight of between about 800 and about 3000.

19. The ambient curing coating composition of claim 4, wherein said coating composition has at least one of a solids content of at least 70 vol % or a volatile organic content (VOC) not exceeding 250 g/l.

20. The ambient curing coating composition of claim 7, wherein the polyester resin containing hydroxyl groups is an alkyd resin.

* * * * *